June 29, 1926.
T. H. WILLIAMS
SHOCK ABSORBER
Original Filed April 11, 1923
1,590,559
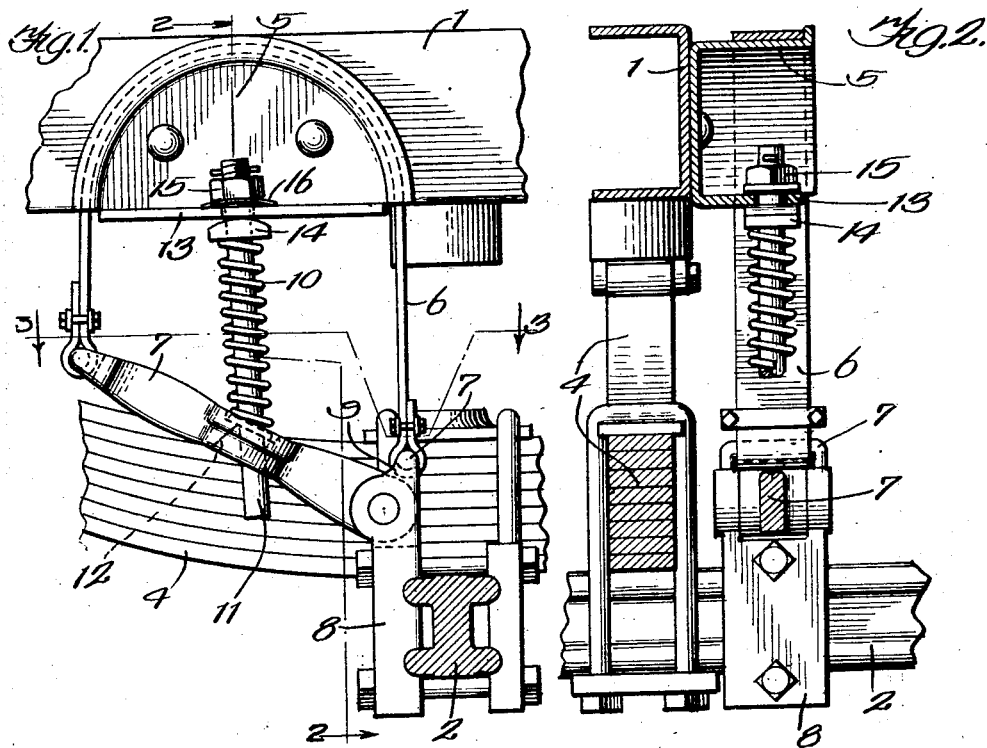
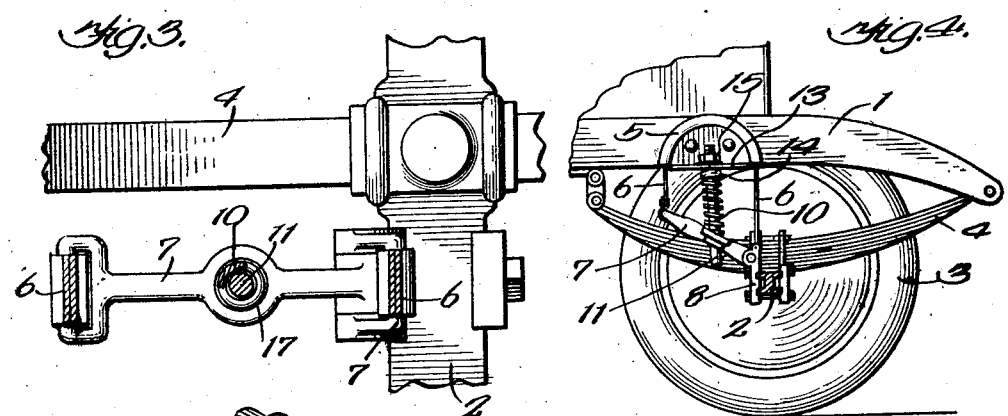
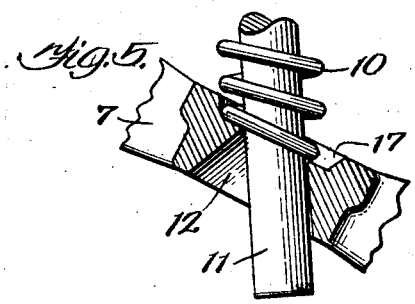
Inventor:
Theron H. Williams Patented June 29, 1926.

1,590,559

UNITED STATES PATENT OFFICE.

THERON H. WILLIAMS, OF CHICAGO, ILLINOIS.

SHOCK ABSORBER.

Application filed April 11, 1923, Serial No. 631,338. Renewed April 5, 1926.

My invention relates to vehicles employing vehicle bodies and running gears together with vehicles body supporting springs between these vehicle elements.

It is the object of my invention to provide an improved form of shock absorber between the body and running gear of such a vehicle. My improved arrangement includes one element in the form of a vehicle body, a second element in the form of a vehicle running gear, and a shock absorber assembled with both vehicle elements and including a friction body upon one of said vehicle elements, a band, preferably looped, whose bight receives said friction body, and a device in connection with said band and assembled with one of said vehicle elements to enable this vehicle element to have pulling action upon the bind or otherwise effect friction between the band and friction body as the vehicle body approaches the running gear. The arrangement is desirably such that the friction is at least not lessened as the vehicle body descends. No friction is preferably produced in the initial downward movement of the vehicle body, so that the vehicle supporting springs are then capable of performing their full function to cushion minor shocks unmodified by the shock absorbers. Further downward movement of the vehicle body will cause shock absorbing friction to arise, this friction desirably increasing as the body moves further downward. The pull upon the band is preferably greater, but diminishes, as the vehicle body rises.

I will explain my invention more fully by reference to the accompanying drawing in which Fig. 1 is a side view, partially in section, of a portion of a vehicle structure having the preferred embodiment of my invention applied thereto; Fig. 2 is a sectional view on line 2—2 of Fig. 1; Fig. 3 is a sectional view on line 3—3 of Fig. 1; Fig. 4 is a view on a smaller scale generally similar to Fig. 1 but showing more of the vehicle; and Fig. 5 is a view showing a portion of the arm partially in section and the adjacent end of the spring mechanism.

Like parts are indicated by similar characters of reference throughout the different figures.

The vehicle illustrated is an automobile, though the invention is not to be thus restricted. A portion 1 of the body of the vehicle is illustrated as is also a portion 2 of the running gear, this running gear being inclusive of vehicle wheels 3. This vehicle body is supported upon the running gear by means of supporting springs, one of these springs being illustrated at 4. The illustrated shock absorber includes a semi-circular friction body 5 that is preferably located upon the vehicle body 1. A band 6 is looped about the friction body 5 that is received in the bight of the band. An arm or member 7 is preferably pivoted at one end upon the mounting plate 8 secured to the running gear of the vehicle. The band 6 is assembled at one end with the running gear of the vehicle preferably by being assembled with an ear 9 projecting from the plate 8. The other end of this band is assembled with the arm 7, preferably at the unmounted end of this arm. As the arm moves it causes the end of the friction member 6 assembled therewith to move with respect to the other end of this member. A compression spring 10, constituting the preferred friction producing means, is interposed between the vehicle body 1 and an intermediate portion of the arm 7 that is preferably nearer the pivoted end of the arm.

In the preferred embodiment of the invention the spring is coiled and receives a bolt 11 in its bore, this bolt passing, at its lower end, through an opening 12 in the arm and at its upper end through a shelf 13 that is preferably an integral continuation of the semi-circular friction producing body 5. A shoulder 14 is provided upon the bolt upon the under side of the shelf 13 and a nut 15 is screwed upon the bolt on the top side of said shelf. A spring washer 16 is interposed between the nut and shelf. The bolt serves as a guide for the spring, though the invention is not to be thus limited. The lower end of the spring 10 is desirably received in a seat 17 formed in the arm 7, the bolt being free to pass up and down through and with reference to the arm.

The spring 10 preferably engages the arm in a manner to cause no frictional engagement between the band and friction body when the vehicle is subject to minor shocks, the frictional engagement between the band and body being initiated when heavier shocks are encountered and increasing as the vehicle body further descends. The pull upon the band is preferably greater, but diminishes, as the vehicle body rises.

There are desirably four such shock absorbers, one at each of the four vehicle wheels, but the invention is not to be thus restricted.

The term band is used in the broad sense of any suitable flexible friction producing member arranged as herein shown and claimed.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. The combination with a vehicle body; of a vehicle running gear carrying said vehicle body; and a shock absorber comprising a friction body upon one of said vehicle elements, a looped band whose bight receives and frictionally engages said friction body, an arm mounted to turn upon one of said vehicle elements and connected with one end of said band whose other end is connected with the vehicle element upon which the arm is mounted, and arm actuating means between the vehicle elements and between said arm and one of said vehicle elements.

2. The combination with a vehicle body; of a vehicle running gear carrying said vehicle body; and a shock absorber comprising a friction body upon one of said vehicle elements, a looped band whose bight receives and frictionally engages said friction body, an arm mounted to turn upon one of said vehicle elements and connected with one end of said band whose other end is connected with the vehicle element upon which the arm is mounted, and an arm actuating spring between the vehicle elements and between said arm and one of said vehicle elements.

3. The combination with a vehicle body; of a vehicle running gear carrying said vehicle body; and a shock absorber comprising a friction body upon one of said vehicle elements, a looped band whose bight receives and frictionally engages said friction body, an arm mounted to turn upon one of said vehicle elements and connected with one end of said band whose other end is connected with the vehicle element upon which the arm is mounted, and arm actuating means between the vehicle elements and between said arm and one of said vehicle elements and engaging said arm between its place of mounting and the loop end connected therewith.

4. The combination with a vehicle body; of a vehicle running gear carrying said vehicle body; and a shock absorber comprising a friction body upon one of said vehicle elements, a looped band whose bight receives and frictionally engages said friction body, an arm mounted to turn upon one of said vehicle elements and connected with one end of said band whose other end is connected with the vehicle element upon which the arm is mounted, and an arm actuating spring between the vehicle elements and between said arm and one of said vehicle elements and engaging said arm between its place of mounting and the loop end connected therewith.

5. The combination with a vehicle body; of a vehicle running gear carrying said vehicle body; and a shock absorber comprising a friction body upon one of said vehicle elements, a looped band whose bight receives and frictionally engages said friction body, an arm mounted to turn upon one of said vehicle elements and connected with one end of said band whose other end is connected with the vehicle element upon which the arm is mounted, and arm actuating means between the vehicle elements and between said arm and one of said vehicle elements and engaging said arm between its place of mounting and the loop end connected therewith and nearer this loop end.

6. The combination with a vehicle body; of a vehicle running gear carrying said vehicle body; and a shock absorber comprising a friction body upon one of said vehicle elements, a looped band whose bight receives and frictionally engages said friction body, an arm mounted to turn upon one of said vehicle elements and connected with one end of said band whose other end is connected with the vehicle element upon which the arm is mounted, and an arm actuating spring between the vehicle elements and between said arm and one of said vehicle elements and engaging said arm between its place of mounting and the loop end connected therewith and nearer this loop end.

7. The combination with a vehicle body; of a vehicle running gear carrying said vehicle body; and a shock absorber comprising a friction body upon one of said vehicle elements, an arm mounted upon the other vehicle element, and a band connected at one end with the unmounted end of the arm and at its other end with the vehicle element upon which the arm is mounted, this band having frictional engagement with said friction body.

8. The combination with a vehicle body; of a vehicle running gear carrying said vehicle body; and a shock absorber comprising a friction body upon one of said vehicle elements, an arm mounted upon the other vehicle element, and a band connected at one end with the unmounted end of the arm and at its other end with the vehicle element upon which the arm is mounted, this band having frictional engagement with said friction body, and in which said friction body forms a bight.

9. The combination with a vehicle body; of a vehicle running gear; and a shock absorber comprising a friction body upon one of said vehicle elements, an arm mounted upon the other vehicle element, and a band connected at one end with the unmounted end of the arm and at its other end with the vehicle element upon which the arm is mounted, this band having frictional engagement with said friction body, and arm actuating means between the vehicle elements and between said arm and one of said vehicle elements.

10. The combination with a vehicle body; of a vehicle running gear; and a shock absorber comprising a friction body upon one of said vehicle elements; an arm mounted upon the other vehicle element, a band connected at one end with the unmounted end of the arm and its other end with the vehicle element upon which the arm is mounted, this band having frictional engagement with said friction body and in which said friction body forms a bight; and arm actuating means between the vehicle elements and between said arm and one of said vehicle elements.

11. The combination with one element in the form of a vehicle body; of a second element in the form of a vehicle running gear; and a shock absorber operatively connected with said vehicle elements and comprising a friction body, a member frictionally engaging said friction body and an arm operable by the vehicle body and assembled with one end of the shock absorber member that frictionally engages the friction body and in pulling relation to this end of said member as the vehicle body and running gear approach to cause this end of said member to move with respect to the other end of said member.

12. The combination with one element in the form of a vehicle body; of a second element in the form of a vehicle running gear; and a shock absorber operatively connected with said vehicle elements and comprising a friction body, a member frictionally engaging said friction body and an arm operable by the vehicle body and assembled with one end of the shock absorber member that frictionally engages the friction body and in pulling relation to this end of said member as the vehicle body and running gear approach and separate to cause this end of said member to move with respect to the other end of said member.

13. The combination with one element in the form of a vehicle body; of a second element in the form of a vehicle running gear; and a shock absorber operatively connected with said vehicle elements and comprising a friction body, a member frictionally engaging said friction body and an arm operable by one of said vehicle elements and assembled with one end of the shock absorber member that frictionally engages the friction body and in pulling relation to this end of said member as the vehicle body and running gear approach to cause this end of said member to move with respect to the other end of said member.

14. The combination with one element in the form of a vehicle body; of a second element in the form of a vehicle running gear; and a shock absorber operatively connected with said vehicle elements and comprising a friction body, a member frictionally engaging said friction body and an arm operable by one of said vehicle elements and assembled with one end of the shock absorber member that frictionally engages the friction body and in pulling relation to this end of said member as the vehicle body and running gear approach and separate to cause this end of said member to move with respect to the other end of said member.

In witness whereof, I hereunto subscribe my name this 2nd day of April A. D., 1923.

THERON H. WILLIAMS.